(12) United States Patent
Bhide et al.

(10) Patent No.: US 11,762,988 B1
(45) Date of Patent: Sep. 19, 2023

(54) RESTRICTING ACCESS TO TRANSACTIONS BASED ON INFORMATION REQUIREMENTS

(71) Applicant: Coupa Software Incorporated, San Mateo, CA (US)

(72) Inventors: Sandeep Damodar Bhide, Randolph, NJ (US); Scott Harris, Menlo Park, CA (US)

(73) Assignee: Coupa Software Incorporated, San Mateo, CA (US)

( * ) Notice: Subject to any disclaimer, the term of this patent is extended or adjusted under 35 U.S.C. 154(b) by 202 days.

(21) Appl. No.: 16/591,190

(22) Filed: Oct. 2, 2019

(51) Int. Cl.
*G06F 21/55* (2013.01)

(52) U.S. Cl.
CPC ............... *G06F 21/552* (2013.01); *G06F 2221/034* (2013.01)

(58) Field of Classification Search
CPC .............. G06F 21/552; G06F 2221/034
See application file for complete search history.

(56) References Cited

U.S. PATENT DOCUMENTS

| | | | | |
|---|---|---|---|---|
| 5,732,400 | A * | 3/1998 | Mandler et al. | G06Q 20/02 705/26.44 |
| 8,065,202 | B1 | 11/2011 | Ballaro et al. | |
| 8,364,712 | B2 * | 1/2013 | O'Sullivan et al. | G06F 16/9537 707/783 |
| 10,878,041 | B2 * | 12/2020 | Victor | G06F 16/93 |
| 11,157,850 | B2 * | 10/2021 | Harris et al. | G06Q 10/06315 |
| 2002/0104018 | A1 * | 8/2002 | Singhani et al. | G06Q 40/00 715/236 |
| 2002/0161602 | A1 | 10/2002 | Dougherty et al. | |
| 2003/0154154 | A1 | 8/2003 | Sayal et al. | |
| 2004/0187027 | A1 * | 9/2004 | Chan | H04L 63/0428 705/51 |
| 2004/0225571 | A1 | 11/2004 | Urali | |
| 2005/0144046 | A1 * | 6/2005 | Schloss | G06Q 40/08 705/4 |
| 2007/0016514 | A1 * | 1/2007 | Al-Abdulqader et al. | G06Q 10/06311 705/37 |
| 2008/0120573 | A1 | 5/2008 | Gilbert et al. | |
| 2008/0201254 | A1 | 8/2008 | Sharma et al. | |
| 2008/0300959 | A1 * | 12/2008 | Sinha et al. | G06Q 30/06 705/7.31 |
| 2011/0119178 | A1 | 5/2011 | Clayton et al. | |

(Continued)

OTHER PUBLICATIONS

"Oracle Sourcing Implementation and Administration Guide", Oracle Help Center, Oracle Corporation, May 24, 2017, Retrieved from the Internet: <URL: https://web.archive.org/web/20130524055448/ https://docs.oracle.com/cd/E18727_01/doc.121/e13411/ T354132T354136.htm> (Year: 2017).*

(Continued)

*Primary Examiner* — Carl G Colin
*Assistant Examiner* — Zhe Liu
(74) *Attorney, Agent, or Firm* — Baker Botts L.L.P.

(57) ABSTRACT

Systems and methods for obtaining required information prior to initiation of a transaction are described herein. In an embodiment, a system stores entity data defining a plurality of entities and data record requirement data identifying one or more required data record fields for one or more transactions. The system receives a request to initiate a transaction from a first client computing device corresponding to an account of a first entity. The system subsequently receives a request to view or participate in the particular transaction from a second client computing device corresponding to an account of a second entity. The system determines that the second entity has not provided data for the one or more required data record fields and, in response, restricts the second client computing device from viewing or participating in the transaction until the second entity has provided the data for the one or more required data record fields.

16 Claims, 10 Drawing Sheets

(56) References Cited

U.S. PATENT DOCUMENTS

| | | | |
|---|---|---|---|
| 2011/0252463 A1* | 10/2011 | Yeleshwarapu et al. ................... G06F 21/6218 | 726/7 |
| 2011/0295761 A1 | 12/2011 | Sudo et al. | |
| 2012/0124027 A1* | 5/2012 | Hnatio ................ G16H 50/80 | 707/E17.108 |
| 2012/0159345 A1* | 6/2012 | Gonsalves ........... G06F 3/0482 | 715/745 |
| 2013/0332210 A1 | 12/2013 | Wyganowski et al. | |
| 2014/0033327 A1* | 1/2014 | Conte ................ G06F 21/6245 | 726/28 |
| 2014/0172486 A1* | 6/2014 | Kwan et al. ... G06Q 10/063118 | 705/7.17 |
| 2014/0278626 A1 | 9/2014 | Stollarski et al. | |
| 2015/0039359 A1* | 2/2015 | Katakol et al. ...... G06Q 10/063 | 705/7.11 |
| 2015/0088597 A1* | 3/2015 | Doherty et al. .... G06Q 10/0635 | 705/7.28 |
| 2015/0365359 A1* | 12/2015 | Hasan .................. H04L 51/10 | 709/206 |
| 2017/0287032 A1* | 10/2017 | Barday ................ G06Q 50/265 | |
| 2018/0129989 A1* | 5/2018 | Bowers ............ G06Q 10/0635 | |
| 2019/0266533 A1 | 8/2019 | Harris et al. | |
| 2019/0287106 A1* | 9/2019 | Sadeddin et al. .. G06Q 20/4016 | |
| 2020/0293962 A1* | 9/2020 | Herman et al. .... G06Q 10/0633 | |

OTHER PUBLICATIONS

"SAP Ariba Applications Q2 2019 release guide", SAP Help Portal, SAP Software Solutions, Apr. 19, 2019, Retrieved from the Internet :< https://help.sap.com/doc/65bba9c25133495a9df3d22eff7060e1/cloud/en-US/Apps_Q2_2019_RG.pdf> (Year: 2019).*

Screen captures from YouTube video clip entitled "Participating in a RFI or RFP on Ariba Network," 4 pages, uploaded on Oct. 12, 2018 by user "SAP Ariba"; Retrieved from Internet: <https://www.youtube.com/watch?v=AWeji94hgvl> (Year: 2018).*

* cited by examiner coupa IT Data Storage for EMEA invitation - Sourcing Event #1580    700

Coupa25-0 has invited you to the sourcing event: IT Data Storage for EMEA.

If you intend to participate, review the event timeline and accept the terms and conditions of the event, if applicable.

We are also requiring the completion of our Risk Assessment Questionnaires prior to viewing or responding to the Event.

Click the "My Responses" tab to provide your response, which may include Attachments, Questionnaires, and Items and Lots.

Response due date: Tuesday, 03 September 2019 05:00 PM PDT

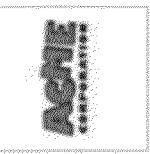

Want to participate later?
Click I intend to Participate button to let the buyer know.

Need more info?
Click View Event and you will be taken to the event page.

I Intend to Participate    View Event    Complete Risk Assessment
                            702           704
                                          *Required to Respond All questions should be asked using the event message board (bottom left of the event). Having technical issues? Contact sourcing.support@coupa.com

FIG. 7

Evaluation

Risk-Information Security Policy Control [IT Data Storage] - Onetime - Period Start 13 Jul 19

Workspaces: Risk Assess ▾

[Enter Keyword(s)] 🔍

Delegate | Recalc | Save | Cancel | Submit 902

○ Global
○ Overview & Instructions
○ B1. Business Information

| Item # | Description | Response | N/A | Actions |
|---|---|---|---|---|
| 0.01000000 | Are there any material claims or judgments against the company? | ▾ | ☐ | 🔲 |
| 0.02000000 | Has your company suffered a data loss or security breach within the last 3 years? | ▾ | ☐ | 🔲 |
| 0.03000000 | Have any of your Third Party Vendors suffered a data loss or security breach within the last 3 years? | ▾ | ☐ | 🔲 |
| 0.04000000 | Does your company have a backup site physical address? | ▾ | ☐ | |

○ A. Risk Management

| Item # | Description | Response | N/A | Actions |
|---|---|---|---|---|
| 1.01000000 ● | [A.1] Is there a risk assessment program that has been approved by management, communicated to appropriate constituents and an owner to maintain and review the program? If yes, does it include: | ▾ | ☐ | 🔲 |
| 1.02000000 ● | [A.2] Are controls identified for each risk classified as: preventive, detective, corrective, predictive (technical or administrative controls)? | ▾ | | |

○ B. Security Policy

RESTRICTING ACCESS TO TRANSACTIONS BASED ON INFORMATION REQUIREMENTS

FIELD OF THE DISCLOSURE

The present disclosure is in the technical field of configurable software platforms and platform interfaces. The disclosure also is in the technical field of facilitating transactions between computing devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

Many software packages provide interfaces for facilitating transactions between computing devices. The software packages may streamline the transaction processing by providing an interface through which a person can easily see available transactions, review additional information relating to the transaction, or directly participate in the transactions.

While such software packages increase the ease at which users corresponding to different entities can transact, the software packages often fail to provide interfaces which ensure that the required information is provided before the transaction is performed. For instance, a requesting company transacting with an IT company may need to perform an internal risk assessment before opening up their systems and customer data to the IT company. The data required to perform the internal risk assessment may become difficult to obtain, especially after bids have been placed on the transaction and an IT company has been accepted.

While some software packages are able to collect entity data and provide required information to transacting entities, the software packages require the entity to actually initially provide the data. It can be difficult to obtain such data ahead of time since multiple different entities may have different requirements for information. A first entity may have internal risk assessment requirements that require answers to questions from a particular survey while a second entity may rely on the software package to compute a risk value based on answers from a different survey.

Given the difficulties in obtaining information in advance of a transaction, many systems allow the individual entities to attempt to obtain the information after the transaction has been initiated. But once the transaction has been initiated, the transacting entities often have little incentive to provide the information in a timely manner. Even if the transacting entities require the information to perform the tasks of the transaction, it can take weeks to months to obtain the information, thereby creating unnecessary delays in the promises.

Thus, there is a need for a system which can readily identify information needed by different entities for performing transactions and which can create a means by which that information is provided prior to the acceptance or initiation of those transactions.

SUMMARY

The appended claims may serve as a summary of the disclosure.

BRIEF DESCRIPTION OF THE DRAWINGS

In the drawings:

FIG. 7 depicts an example information request interface.

FIG. 9 depicts an example questionnaire interface for providing required information.

DETAILED DESCRIPTION

Figure 1:
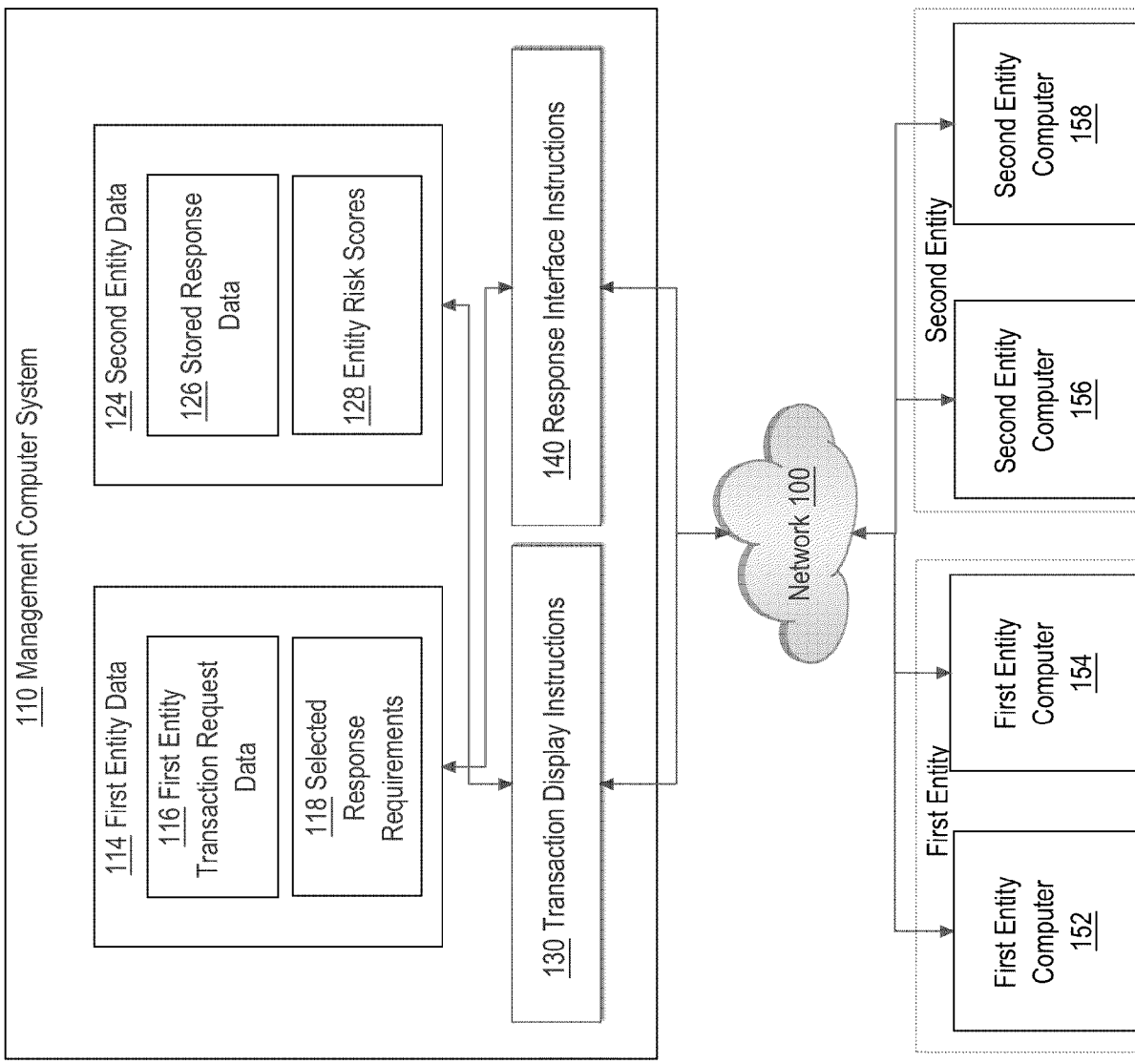
FIG. 1 is a block diagram of an example computer network system in which various embodiments may be practiced.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present invention. Embodiments are described in sections below according to the following outline:

1. GENERAL OVERVIEW
2. SYSTEM OVERVIEW
3. ENFORCING REQUIREMENTS
   3.1 ENTITY SPECIFIC REQUIREMENTS
   3.2 RESTRICTING ACCESS TO VIEW OR PARTICIPATE
   3.3 SOURCING EVENT EXAMPLE
4. BENEFITS OF CERTAIN EMBODIMENTS
5. IMPLEMENTATION EXAMPLE - HARDWARE OVERVIEW

1. General Overview

Systems and methods for obtaining required information prior to acceptance of a transaction are described herein. In an embodiment, a management computer system stores entity profiles for a plurality of entities which utilize the management computer system to initiate transactions. For a particular entity, the management computer system also stores data identifying required data fields for one or more transactions or transaction types. When a computing device corresponding to a second entity attempts to view or participate in a transaction initiated by a computing device corresponding to the particular entity, the management computer system determines whether the second entity has supplied data for the required data fields. If the second entity has not supplied data for the required data fields, the system restricts the computing device corresponding to the second entity from viewing or participating in the transaction until the data is supplied.

In an embodiment, a method comprises using a management computer system, storing entity data defining a plurality of entities and associating each entity of the plurality of entities with a plurality of user accounts, the plurality of entities having access to the management computer system programmed to provide an interface which provides options for performing a plurality of tasks; using the management computer system, storing data record requirement data identifying one or more required data record fields for one or more transactions; receiving, through the interface executing on a first client computing device corresponding to an account of a first entity, a request to initiate a particular transaction; receiving, through an interface executing on a second client computing device corresponding to an account of a second entity, a request to view or participate in the particular transaction; determining, from entity data for the second entity, that the management computer system does not have stored data for the one or more required data record fields for the second entity; in response to determining that the management computer system does not have stored data for the one or more required data record fields for the second entity: generating one or more hyperlinks which, when selected, would cause the second client computing device to display, through the interface executing on the second client computing device, one or more options for inputting data into the one or more required data record fields; through the interface executing on the second client computing device, restricting access to view or participate in the particular transaction and causing display of the one or more hyperlinks; subsequently determining that the second client computing device has input and stored data in the one or more required data record fields and, in response, stopping restricting access to view or participate in the particular transaction.

In an embodiment, a method comprises using a management computer system, storing entity data defining a plurality of entities including a sourcing entity and a provider entity; storing transaction requirement data identifying one or more risk compliance surveys for a particular transaction type for the sourcing entity; receiving, through an interface executing on a first client computing device corresponding to an account of the sourcing entity, a request to create a sourcing event of the particular transaction type; generating the sourcing event of the particular transaction type; receiving, through an interface executing on a second client computing device corresponding to the provider entity, a request to view or participate in the sourcing event; determining, from entity data for the provider entity, that the management computer system does not have stored data for the one or more risk compliance surveys for the provider entity; in response to determining that the management computer system does not have stored data for the one or more risk compliance surveys for the provider entity: generating one or more hyperlinks which, when selected, would cause the second client computing device to display, through the interface executing on the second client computing device, one or more options for inputting data into the one or more risk compliance surveys; through the interface executing on the second client computing device, restricting access to view or participate in the sourcing event and causing display of the one or more hyperlinks; subsequently determining that the second client computing device has input and stored data in the one or more risk compliance surveys and, in response, stopping restricting access to view or participate in the sourcing event.

2. System Overview

FIG. 1 is a block diagram of an example computer network system in which various embodiments may be practiced. FIG. 1 is shown in simplified, schematic format for purposes of illustrating a clear example and other embodiments may include other elements.

In an embodiment, a networked computer system comprises a management computer system 110, first entity computers 152, 154, and second entity computers 156, 158, which are communicatively coupled directly or indirectly via network 100. The management computer system 110, first entity computers 152, 154, and second entity computers 156, 158 and other elements of the system may each comprise an interface compatible with the network 100 and are programmed or configured to use standardized protocols for communication across the networks such as TCP/IP, Bluetooth, and higher-layer protocols such as HTTP, TLS, and the like.

Management computer system 110 may be implemented using a server-class computer or other computers having one or more processor cores, co-processors, or other computers. Management computer system 110 may be a physical server computer and/or a virtual server instance stored in a data center, such as through cloud computing.

Management computer system 110 stores first entity data 114, second entity data 124, transaction display instructions 130, and response interface instructions 140. While first entity data 114 and second entity data 124 are depicted as including different information for the purposes of providing a clear example, in embodiments, first entity data 114 may include additional information, such as the information depicted in second entity data 124, and vice versa with respect to second entity data 124. The entity data may also define particular entities and accounts corresponding to the entities.

First entity data 114 comprises first entity transaction request data 116 and selected response requirements 118. First entity transaction request data comprises information received from a computer corresponding to a first entity, such as one of the first entity computers 152, 154, which specifies parameters for a requested transaction, such as a transaction name, type, starting bid, or other information relating to a requested transaction. Selected response requirements 118 comprises information received from a computer corresponding to a first entity, such as one of the first entity computers 152, which identifies one or more required data record fields for the entity, one or more transactions for the entity, and/or one or more transaction types for the entity.

Second entity data 124 comprises stored response data 126 and entity risk scores 128. Stored response data 126 comprises information received from a computer corresponding to a second entity, such as one of second entity computers 156, 158, which comprises responses for data record fields, such as responses for surveys or other requests for information. Entity risk scores 128 comprise one or more risk scores that have been computed for the second entity by the management computer system based, at least in part, on provided information in stored response data 126.

Transaction display instructions 130 comprise computer readable instructions which, when executed, cause the management computer system to cause display of one or more interfaces for generating a transaction request and/or for viewing transaction requests generated by different entities. For example, the management computer system may provide an interface for generating sourcing events and an interface for participating in sourcing events.

Response interface instructions 140 comprise computer readable instructions which, when executed, cause the management computer system to cause display of one or more interfaces for supplying information to the management computer system and/or to one or more other entities. For example, the management computer system may provide an interface for responding to questions of a survey and/or providing other data, such as data relating to insurance.

Computer executable instructions described herein may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. In another embodiment, the programmed instructions also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. In other words, the drawing figure may represent the manner in which programmers or software developers organize and arrange source code for later compilation into an executable, or interpretation into bytecode or the equivalent, for execution by the management computer system 110.

The Management computer system 110 is accessible over a network 100 by multiple computing devices, such as the first entity computers 152, 154 and/or second entity computers 156, 158. Although there are two computers depicted for each entity in FIG. 1, any other computers may be registered with the server 102 at any given time. Thus, the elements in FIG. 1 are intended to represent one workable embodiment but are not intended to constrain or limit the number of elements that could be used in other embodiments. In an embodiment, the first entity computers 152 and 524 may be restricted to only users from a single entity. In other words, although more than one computer may be used, only verified users of a single entity may access information stored in the management computer system 110 from these computers. Any applicable means of restricting unauthorized users from accessing data stored in management computer system 110 may be used (for example, password and username, two-step authentication, or other means). Further, each of the second entity computers 126 and 128 may correspond to one or more second entities.

The computing devices such as the first entity computers 152, 154 and/or second entity computers 156, 158 may comprise computers that include hardware capable of communicatively coupling the computers to one or more server computers, such as server computer 102 over one or more service providers. For example, first entity computers 152, 154, and/or second entity computers 156, 158 may include a network card that communicates with server computer 102 through home or office wireless routers (not illustrated in FIG. 1) coupled to an internet service provider. The first entity computers 152, 154 and/or second entity computers 156, 158 may be any of smart phones, personal computers, tablet computing devices, PDAs, laptops, or any other computing devices capable of transmitting and receiving information and performing the functions described herein.

Network 100 may be implemented by any medium or mechanism that provides for the exchange of data between the various elements of FIG. 1. Examples of network 100 include, without limitation, a cellular network, communicatively coupled with a data connection to the computing devices over a cellular antenna, one or more Local Area Networks (LANs), one or more Wide Area Networks (WANs), one or more Ethernets or the Internet, or one or more terrestrial, satellite or wireless links, or a combination thereof. For purposes of illustrating a clear example, network 100 is shown as a single element but in practice, network 100 may comprise one or more local area networks, wide area networks, and/or internetworks. The various elements of FIG. 1 may also have direct (wired or wireless) communications links, depending upon a particular implementation.

3. Enforcing Requirements

Figure 2:
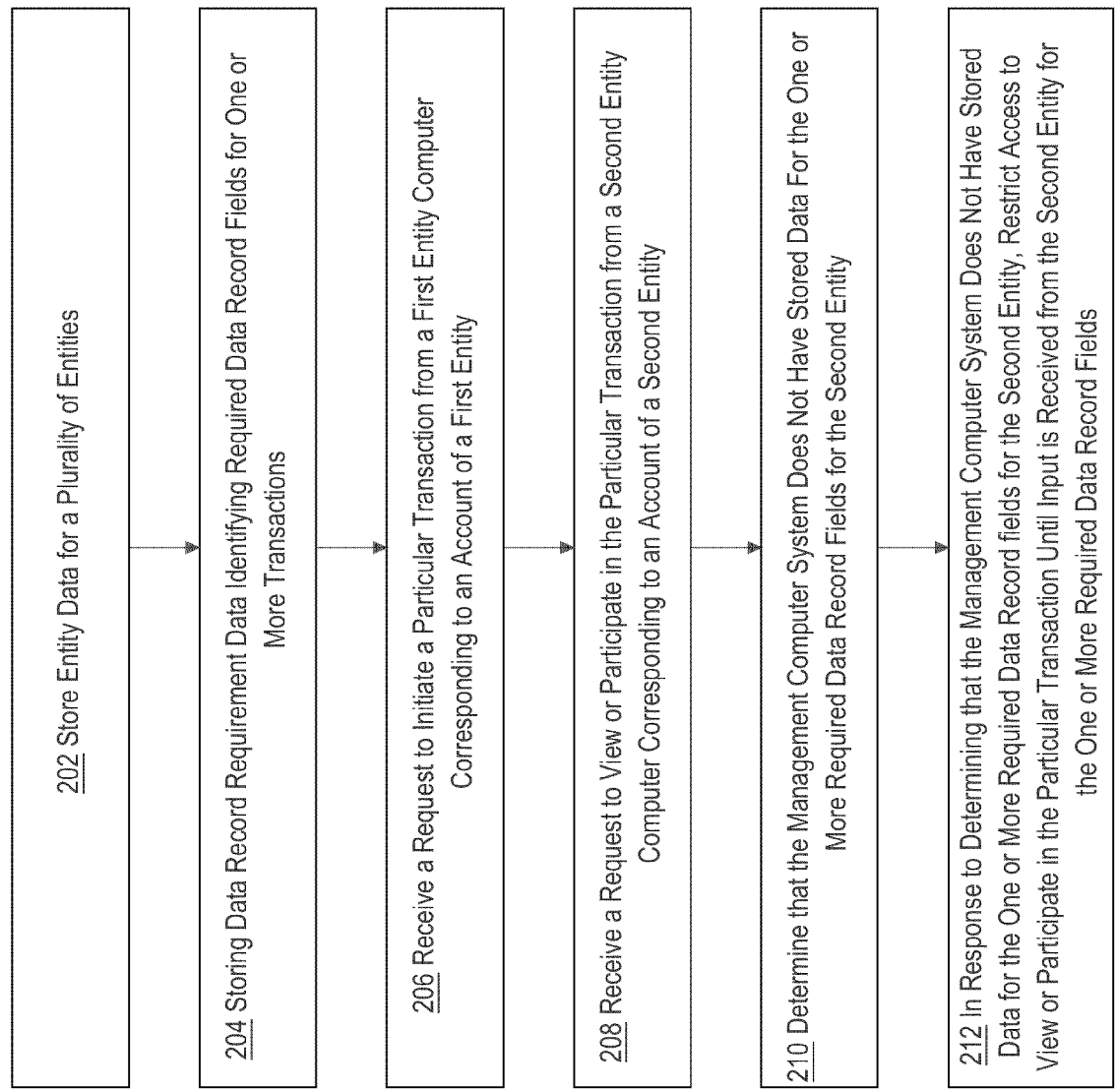
FIG. 2 depicts an example method for generating and enforcing requirements for information by restricting a computing device's ability to participate and/or view a transaction.

FIG. 2 depicts an example method for generating and enforcing requirements for information by restricting a computing device's ability to participate and/or view a transaction.

At step 202, entity data is stored for a plurality of entities. For example, the management computer system 110 may store data defining a plurality of entities and associating each entity of the plurality of entities with a plurality of user accounts. The plurality of entities may have access to the management computer system 110 which is programmed to provide an interface which provides options for performing a plurality of tasks, such as generating sourcing events for procurement and/or participating in sourcing events. Each entity of the plurality of entities may be comprise a business, organization, and/or other grouping corresponding to a plurality of accounts corresponding to members of the business, organization, and/or other grouping.

At step 204, data record requirement data identifying required data record fields for one or more transactions is stored. For example, the management computer system 110 may store data identifying information required from an entity before the entity may view and/or participate in a transaction. The required data record fields may be entity specific, transaction specific, and/or transaction type specific as described further herein. The required information may be requested specifically by individual entities and unrelated to authentication of a client computing device or user of the client computing device.

At step 206, a request to initiate a particular transaction is received from a first entity computer corresponding to an account of a first entity. For example, the first entity computer may request that the management computer system 110 generate and display a transaction request which specifies one or more details for a transaction between multiple entities. An example of a transaction request is a sourcing event where the first entity computer identifies a product and/or service for the first entity to source from one or more second entities. A plurality of entities may view the transaction request and accept the transaction request, respond to the transaction request, and/or bid on the transaction request.

At step 208, a request to view or participate in the particular transaction is received from a second entity computer corresponding to an account of a second entity. As an example, a second entity computer may request, from the management computer system 110, a display of one or more currently open transactions. As used herein, a currently open transaction is a transaction that has not been completed or entered into by another entity. The second entity computer may receive input through a graphical user interface which requests a view of currently open transactions generally and/or currently open transactions which meet particular criteria, such as transactions for a particular type of good and/or service. Other example may include receiving a request to view additional details on a transaction, such as through a selection of the transaction through an interface, and/or receiving a request to bid on the transaction, respond to the transaction, or engage in the transaction.

At step 210, the system determines that it does not have stored data for the one or more required data record fields for the second entity. For example, the management computer system 110 may store, with the entity data for the second entity, any completed data record fields, such as completed surveys or answered questions. The management computer system may determine whether each required data record field has been completed by the second entity using the stored data. If any of the required data record fields are incomplete and/or no longer valid, such as due to expiration of the data, the system determines that it does not have stored data for the one or more required data record fields for the second entity. For example, if stored insurance information for a particular entity includes an expiration date prior to a current date, the system may determine that it does not have stored data for the insurance information for the particular entity.

At step 212, in response to determining that the system does not have stored data for the one or more required data record fields for the second entity, the system restricts access to view or participate in the particular transaction until input is received from the second entity for the one or more required data record fields. For example, the system may blur particular details of the transaction on the second entity computing device and/or remove functionality from a displayed interface on the second entity computing device, such as options for viewing additional details, options for responding to the transaction, options for bidding on the transaction, and/or options for accepting the transaction. The system may continue to restrict the second entity computing device from viewing or participating in the transaction until the system receives input for all of the required data record fields for the transaction.

In an embodiment, the management computer system generates one or more hyperlinks for the second entity computing device. The hyperlinks may be configured to, when selected, cause the display on the second entity computing device to navigate to an interface for inputting data into the one or more required data record fields. For example, if the one or more required data record fields comprise specific surveys corresponding to individual webpages, the one or more hyperlinks may comprise hyperlinks to the individual webpages. Additionally or alternatively, the management computer system may generate one or more destination pages, such as a webpage and/or application interface page, with each of the required data record fields and generate the hyperlink to, when selected, cause navigation to the generated one or more destination pages.

3.1 Entity Specific Requirements

As described above, the one or more required data record fields may comprise entity-specific requirements which are generated and/or selected by an entity computing device corresponding to the first entity. The entity computing device corresponding to the first entity may be a different computing device than the entity computing device that initiates the transaction. For example, an administrator may identify required data record fields generally and/or for particular transaction types such that the requirements apply to any transactions and/or transaction of the particular transaction types generated by other users within the first entity.

In an embodiment, the management computer system provides an interface for identifying and/or generating data record fields that are required for a particular entity. The management computer system may cause display of the interface on a first entity computing device corresponding to the first entity. Through the interface, the management computer system may receive input identifying and/or generating data record fields as required data record fields for the first entity. In response to receiving the input, the management computer system may store data identifying the selected data record fields as required for the first entity.

In an embodiment, the management computer system displays a plurality of data record fields with corresponding descriptions and an option to select the data record field for the first entity. For example, the management computer system may display a drop-down menu which, when selected, displays a list of questions or data record field titles. As another example, the management computer system may display a plurality of data record fields on a page of the interface with an option next to each for selecting the data record field as required. Example data record fields may include insurance policy numbers and expiration dates, requests for information pertaining to management policies and practices, or other questions used for risk mitigation. Thus, the data record fields may range in required data input. Some may require numbers, dates, or string input, while others may merely require a selection of one or more of a plurality of options.

In an embodiment, the management computer system displays options for generating a required data record field. For example, the management computer system may display an interface option which accepts string input for describing a data record field and an option for specifying an answer type for the data record field. Example options for specifying an answer comprise options for identifying a plurality of selectable options and/or options for specifying a type of input accepted by a data record field, such as a date, number, or string.

As a practical example, a user may initially input into a description for a first data record field the text "what type of insurance do you have". The user may then select an option to generate a plurality of selectable options and specify, for each option, a description of said option, such as "malpractice insurance", "generally liability insurance", and "none". The user may then select an option to add a second required data record field and input, into a description for the second data record field, the text "what is the expiration date of your insurance". The user may then select an option to generate a data record field which accepts only date type input.

In an embodiment, the management computer system stores one or more templates. A template, as used herein, refers to a plurality of data record fields with corresponding descriptions. For example, a particular template may comprise a Data Security Assessment Survey comprising a plurality of data security assessment questions and corresponding data record fields for responding to the plurality of data security assessment questions. The management computer system may display options for selecting one or more of the templates as required data record fields. In response to receiving a selection of a particular template, the management computer system may store the particular template as one or more required data record fields. Thus, if the Data Security Assessment Survey is selected, then one or more fields in the Data Security Assessment Survey may be required data record fields for the first entity.

In an embodiment, one or more templates and/or data record fields may be used by the management computer system to generate particular risk evaluation scores. For example, the management computer system may use selected responses and/or input values to generate risk evaluation scores, such as by basing a risk evaluation score on the presence or absence of insurance, on the presence or absence of specific encryption protocols, or on other information in a particular template, a plurality of templates, and/or a plurality of data record fields. In an embodiment, the management computer system displays options for selecting a particular risk evaluation score. In response to receiving a selection of the particular risk evaluation score, the system may store data identifying each data record field and/or each template used to compute the particular risk evaluation score as required data record fields.

In an embodiment, the management computer system displays options for selecting required data record fields, required templates, and/or required scores and/or options for generating required data record fields as part of an interface for generating a particular transaction. For example, in response to receiving a request to generate a sourcing event, the management computer system may display an interface for selecting data record fields, scores, and/or templates as required for the sourcing event and/or for generating data record fields to be required for the sourcing event.

In an embodiment, entities may generate requirements for different types of transactions. For example, the management computer system may cause display of an interface on a first entity computer system with options for selecting a transaction type to correspond to data record fields, scores, and/or templates created or selected through the interface. Thus, an administrator may select, through the interface, a requirement that a specific type of survey be completed for transactions that require disclosure of customer data. In this manner, the management computer system provides functionality for selectively requiring different data inputs based on a type of transaction created by a different and/or same user corresponding to the same entity as the administrator.

Figure 3:
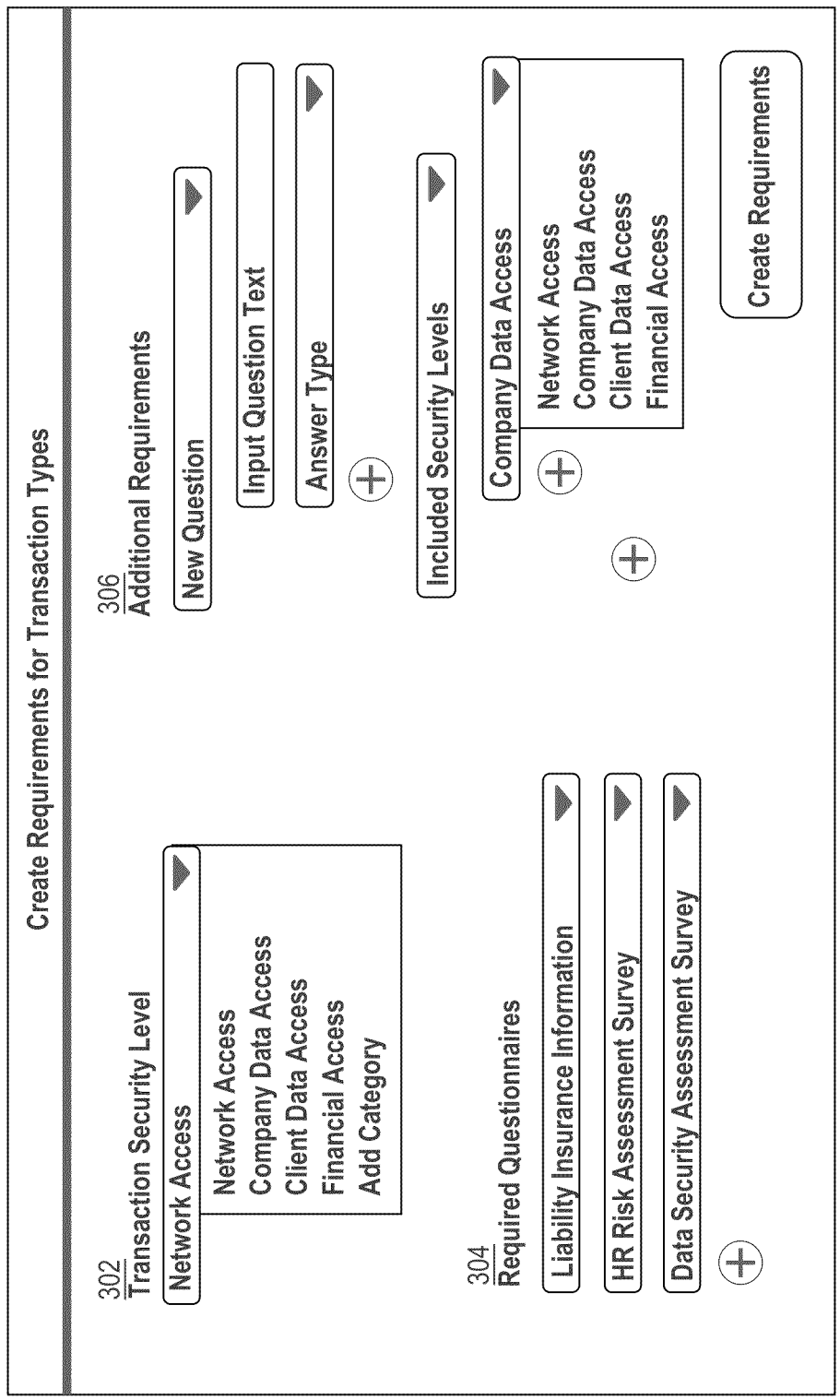
FIG. 3 depicts an example graphical user interface for generating and/or selecting required data record fields for specific types of transactions.

FIG. 3 depicts an example graphical user interface for generating and/or selecting required data record fields for specific types of transactions. Interface 300 comprises an interface for creating requirements for transaction types. The management computer system may cause display of interface 300 on a first entity computing device in response to receiving a request for creating requirements for specific transaction types.

Interface 300 comprises transaction type selection 302, required questionnaires 304, and additional requirements. Transaction type selection 302 comprises one or more options for selecting transaction types to which the requirements will apply. In FIG. 3, transaction type selection 302 comprises a drop-down menu which is populated with transaction types. The transaction types may be configured separately for each entity, such as through the "Add Category" option, and/or pre-generated as default transaction types for different entities. In the interface of FIG. 3, the transaction types identify security levels which identify levels of access of individual transactions, but the systems and methods described herein may be utilized with other transaction types, such as hardware purchase, hardware installs, software purchase, or software installs.

Required questionnaires 304 comprises options for selecting templates for the selected transaction type. For example, the Data Security Assessment Survey selected through the required questionnaires may comprise a plurality of questions relating to data security and data record fields for inputting answers to said plurality of questions. Interface 300 may include a plurality of options for required questionnaires to allow for selection of one or more templates from a plurality of existing templates. Additionally or alternatively, the interface 300 may include options for selecting one or more scores that are based on templates in a similar manner.

Additional requirements 306 comprises options for specifying requirements in addition to the selected questions and/or scores. Additional requirements may include additional questions that can be created through interface 300 and/or an option for including the requirements of other security levels. When all requirements for a transaction type have been identified, the "create requirements" option may be selected to save the data identifying the selected requirements for the selected transaction type.

In an embodiment, when an event is requested, the request may include an identification of the transaction type for the event. Based on the transaction type, the system may identify the required data record fields for the event based on stored data identifying required data record fields, scores, and/or templates for the selected event type. For example, a transaction with the transaction type of "Network Access" may require the data record fields from Liability Insurance Information, HR Risk Assessment Survey, and Data Security Assessment Survey in addition to any requirements for the Company Data Access transaction type based on the selections in FIG. 3.

3.2 Restricting Access to View or Participate

As described above, in response to determining that an entity does not have stored data for one or more required record fields, the management computer system restricts access to view or participate in an event. For example, while displaying one or more events on particular client computing device, the system may determine, for each event, whether the system has stored data for one or more required data record fields for that event from an entity corresponding to the particular client computing device. The system may then restrict the particular computing device from viewing or participating in each event where the system does not have stored data for the one or more required data record fields for that event from the entity corresponding to the particular client computing device.

When the management computer system subsequently determines that an entity that has been restricted from a particular event has stored data in the required data record fields corresponding to the event, the management computer system may stop restricting client computing devices corresponding to the entity from viewing or participating in the event. For example, the management computer system may reevaluate whether a client computing device may access or participate in events each time the client computing device navigates an interface to a page which includes information relating the events and/or to an interface which comprises one or more restrictions based on required data record fields.

Thus, if an initial display of a plurality of events does not include any restrictions, but restrictions are displayed when an event is selected, the management computer system may determine whether to restrict access to view or participate in the event when the event is selected. If the display of the plurality of events includes restrictions, the system may determine which restrictions to apply when the plurality of events are displayed.

In an embodiment, restricting access to view or participate in an event comprises restricting the client computing device from sending messages to accounts corresponding to the event and/or restricting the client computing device from bidding on the event, completing the event, and/or signing a contract associated with the event. For example, the system may cause a "bid" option on the event to appear greyed out and unclickable for the restricted client computing devices. As another example, options may be removed from an interface for the restricted client computing devices, such as messaging or participation options.

In an embodiment, restricting access to view or participate in an event comprises obscuring and/or removing information relating to an event. For example, when displaying the event, the system may display an event type and a value corresponding to the event, such as a starting bid value, but may obscure or remove information such as event details, a name of an entity initiating the event and/or a current bid value for the event. Thus, embodiments may obscure sensitive information from entities which have not passed requisite evaluations. As an example, some information may be blurred out or otherwise obscured on an event interface for each restricted event. As another example, an option for viewing more details may be greyed out and unclickable and/or removed for restricted events.

In an embodiment, the system generates one or more hyperlinks, such as uniform resource locater (URL) links, which, when selected, cause the system to display an interface for inputting information into the one or more required data record fields. For example, the system may store webpages corresponding to each of a plurality of templates. If the required data record fields correspond to a plurality of templates, the system may generate a hyperlink for each template for which the entity does not have stored data. As another example, the system may generate a new webpage with a unique URL for a particular client computing device and populate the webpage with each required data record field for an entity corresponding to the particular client computing device.

The system may display the hyperlinks and/or one or more options corresponding to the hyperlinks on an interface with a restricted event. For example, if a particular entity has completed one of three templates that are required for a particular event, then the system may restrict access to view or participate in the particular event and may display, with displayed information corresponding to the particular event, one or more hyperlinks corresponding to the two templates that have not been completed. Thus, the interface not only provides restrictions for each event, but also provides information regarding why the event is restricted and options for removing the restrictions by inputting the required information.

Figure 4:
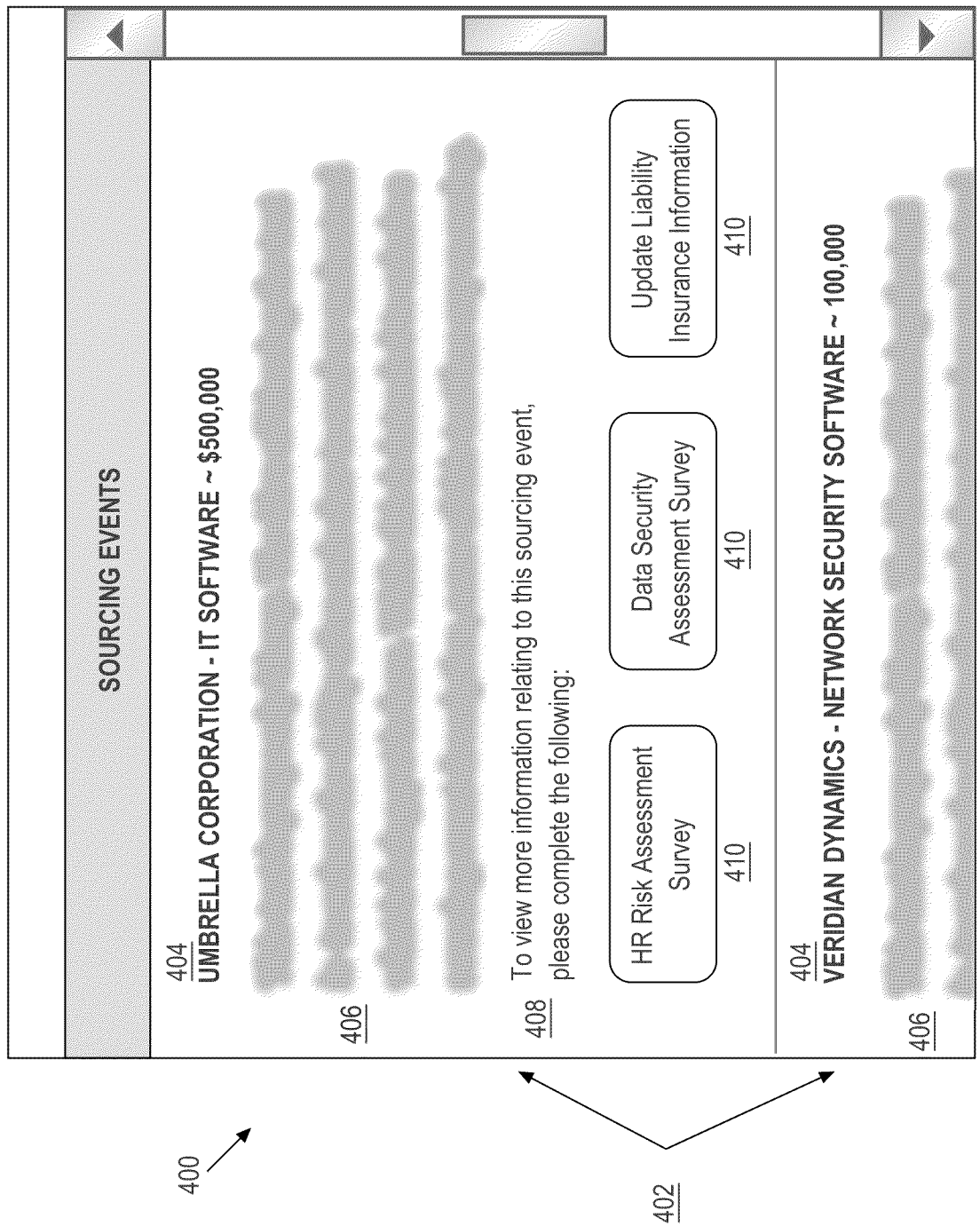
FIG. 4 depicts an example graphical user interface for displaying an interface comprising one or more restricted events with hyperlinks corresponding to required data record fields.

FIG. 4 depicts an example graphical user interface for displaying an interface comprising one or more restricted events with hyperlinks corresponding to required data record fields. Interface 400 comprises events 402, displayed event information 404, restricted event information 406, message 408, and hyperlinks 410. Events 402 comprise events generated by one or more entities, such as sourcing events. For example, the interface 400 of FIG. 4 may be displayed in response to a search for sourcing events relating to sourcing software.

Events 402 comprise displayed event information 404 and restricted event information 406. In the embodiment of FIG. 4 the restricted event information 406 is blurred out while the displayed information 404 comprises information that is selected to be displayed regardless of whether data has been received for required data record fields. Message 408 may be generated in addition to the hyperlinks to indicate a reason that the information is restricted. Each of hyperlinks 410 may direct the interface to a page for inputting data into the required data record fields. For example, the first hyperlink may navigate the interface to display an HR Risk Assessment Survey form while the last of the hyperlinks may navigate the interface to display options for updating Liability Insurance Information. As described herein, the "Update Liability Insurance Information" option may be displayed in response to the system determining that the previous liability insurance information has expired or is about to expire.

3.3 Sourcing Event Example

Figure 6:
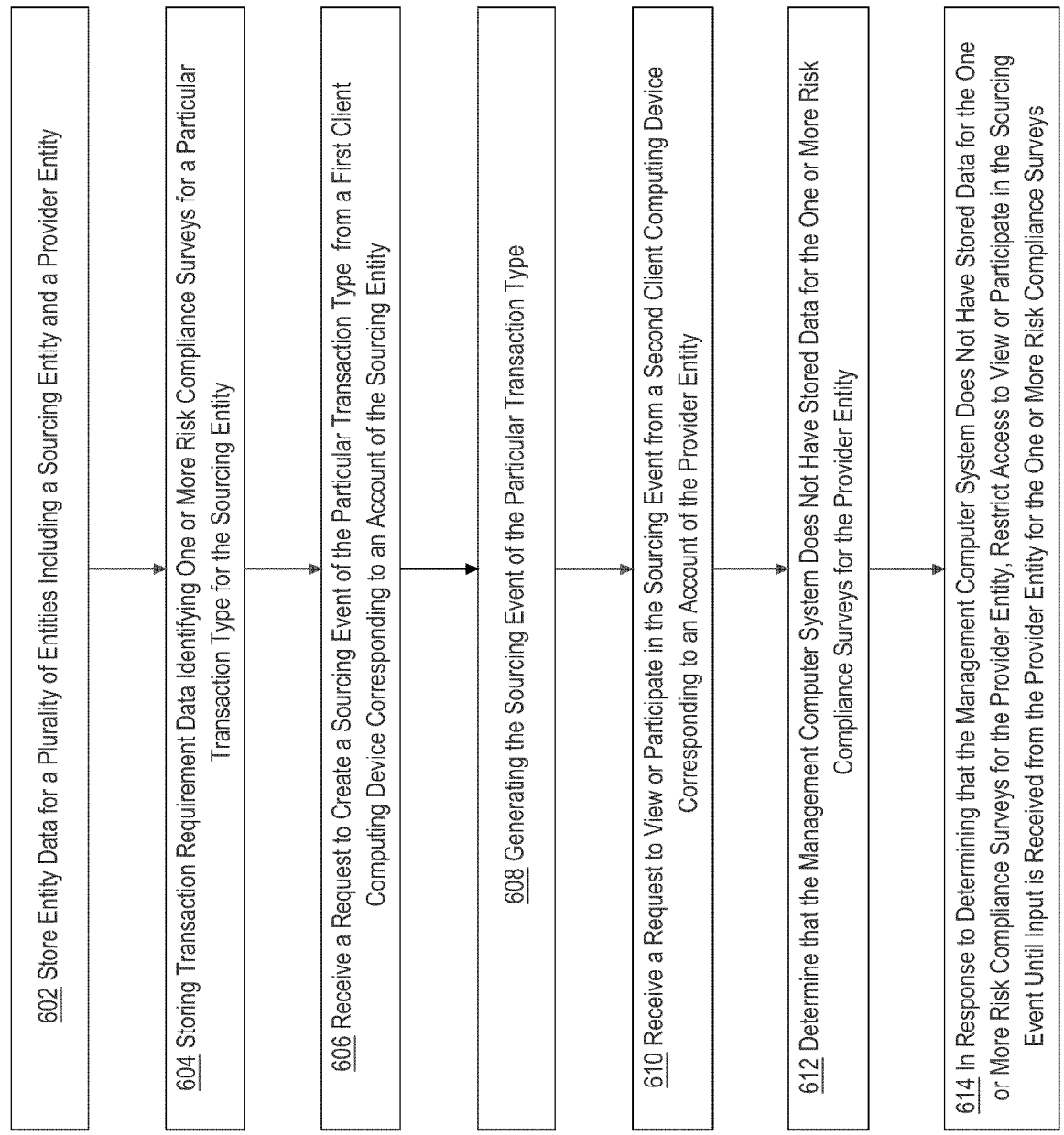
FIG. 6 depicts an example method for generating and enforcing requirements for information by restricting a computing device's ability to participate and/or view a sourcing event.

FIG. 6 depicts an example method for generating and enforcing requirements for information by restricting a computing device's ability to participate and/or view a sourcing event. A sourcing event, as used herein, refers to a computer-implemented transaction where a sourcing entity generates a request for a provider entity to source one or more goods and/or services. During the sourcing event, one or more provider entities may agree to the transaction and/or bid on the transaction through a graphical user interface provided by the management computer system.

At step 602, entity data is stored for a plurality of entities including a sourcing entity and a provider entity. For example, the management computer system may store profile data for the sourcing entity and provider entity which includes identifiers of the entities, past transaction data for the entities, and any stored information relating to the entities. The management computer system may additionally store completed risk compliance surveys, risk scores, and/or other completed survey information for one or more entities.

At step 604, transaction requirement data identifying one or more risk compliance surveys is stored for a particular transaction type for the sourcing entity. For example, a computing device corresponding to the sourcing event may specify one or more surveys and/or scores to be completed for transactions of the particular transaction type, such as through the interface of FIG. 3.

At step 606, a request to create a sourcing event of the particular transaction type is received from a first client computing device corresponding to an account of the sourcing entity. For example, the computing device corresponding to the sourcing entity may send a request to the management computer system to generate a sourcing event for a sourcing for sourcing one or more goods and/or services. The request may include an identifier of a transaction type to correspond to the request.

At step 608, the sourcing event of the particular transaction type is generated. For example, the management computer system may store data identifying the sourcing event and provide an interface to one or more computing devices corresponding to other entities which includes the data identifying the sourcing event with options for viewing and/or participating in the sourcing event.

At step 610, a request to view or participate in the sourcing event is received from a second client computing device corresponding to an account of the provider entity. For example, the second client computing device may send a request to the management computer system to display one or more sourcing events. In response to the request, the management computer system may identify at least the sourcing event that was generated in step 608. In an embodiment, the request to view or participate in the sourcing event is the initial search. In other embodiments, the request to view or participate in the sourcing event may include requesting more details regarding the sourcing event, requesting to participate in the sourcing event, and/or requesting to send a message to the creator of the sourcing event.

At step 612, the system determines that it does not have stored data for the one or more risk compliance surveys for the provider entity. For example, the system may identify each risk compliance survey which is required to view or participate in a sourcing event of the particular transaction type. The system may search the stored entity data for the provider entity to determine whether the provider entity has completed all of the required risk compliance surveys.

At step 614, in response to determining that the system does not have stored data for the one or more risk compliance surveys for the provider entity, the system restricts access to view or participate in the sourcing event until input is received from the provider entity for the one or more risk compliance surveys. For example, the system may obscure or remove information relating to the sourcing event, such as the sourcing event details, and/or remove or augment interface options to prevent the second computing device from bidding or the sourcing event and/or sending messages to the first computing device. If the system subsequently determines that the provider entity has completed all required risk compliance surveys for the particular transaction type, the system may stop restricting access to view or participate in the sourcing event for the second computing device.

A practical example of a graphical user interfaces for generating and enforcing requirements for sourcing events is depicted in FIGS. 7-10. FIG. 7 depicts an example information request interface. Interface 700 comprises an invite to participate in a sourcing event. The invite to participate in the sourcing event includes information identifying a requirement to complete a Risk Assessment Questionnaire prior to viewing or responding to the event. Interface 700 further includes view event option 702 and complete risk assessment option 704. In response to a selection of the complete risk assessment option 704, the system may cause display of the Risk Assessment Questionnaire.

Figure 8:
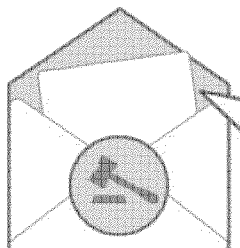
FIG. 8 depicts an example sourcing event interface prior to completion of required information.

In response to a selection of the view event option 702, the system may cause display of an event interface, such as the interface of FIG. 8. FIG. 8 depicts an example sourcing event interface prior to completion of required information. Interface 800 comprises basic event information, such as event start times and end times, but no event details. Interface 800 further includes an enter response option 802 which is not selectable as the Risk Assessment Questionnaire has not been completed. Risk assessment option 804 comprises a selectable option for completing the Risk Assessment Questionnaire, thereby completing the requirements for the sourcing event.

In a response to a selection of the risk assessment option 804 (or the risk assessment option 704 of FIG. 7), the system may cause display of a Risk Assessment Questionnaire interface. FIG. 9 depicts an example questionnaire interface for providing required information. Interface 900 comprises a plurality of questions with selectable options for providing answers to the plurality of questions. Interface 900 further includes a submit option 902 for finalizing answers to the questions and completing the Risk Assessment Questionnaire.

Figure 10:
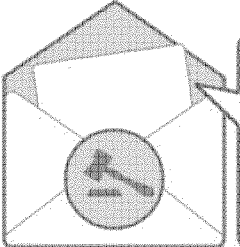
FIG. 10 depicts an example sourcing event interface after completion of required information.

After the Risk Assessment Questionnaire has been completed, the system may cause display of an event interface, such as the interface of FIG. 10 which removes the restrictions of the interface of FIG. 8. FIG. 10 depicts an example sourcing event interface after completion of required information. Interface 1000 comprises basic event information, such as event start times and stop times. Additionally, interface 1000 may include options to see further details regarding the event. Interface 1000 further includes an enter response option which is selectable as the Risk Assessment Questionnaire has been completed. Thus, the system is able to limit the viewing or participation in an event until required information is provided.

4. Benefits of Certain Embodiments

The systems and methods described herein provide an improved interface which both decreases the amount of information needed to be supplied by a provider entity while ensuring that the requesting entity is provided with all required information prior to the initiation of the transaction. By restricting providers form viewing or participating in transactions based on required information for those transactions, the interface allows the providers to focus on providing only the information required for transactions the which are of interest to the provider. Thus, less time is wasted providing information which is not needed by any requesting devices. On the other side, the requester is able to ensure that any provider with which a transaction is entered, such as through a sourcing event, has provided all of the information that the requester needs.

The systems and methods provided here also provide benefits by storing the responses of the provider entities for use with other transactions. The provider is given a clear indication of which surveys are required by the most users and can provide those answers once. In this manner, the provide can enter into future transactions which require the same information without providing the information a second time. Additionally, as the provider completes more of the surveys, more transactions will be made available to the provider.

The systems and methods described herein may additionally ensure the provider is willing and able to provide necessary information while also protecting the information provided. For instance, the management computer system stores responses by the provider and ensures that those responses have been provided before allowing the provider to participate in sourcing events. The management computer system may additionally only provide the provider's information to the requester when the transaction has been accepted. Thus, the management computer system can limit participants in a sourcing event to only those that have provided the required information, but also only provide said required information to the requester for the provider or providers selected by the requester. The provider's information is thus only provided to the management computer system in advance of the transaction.

Thus, the systems and methods described herein provide an improved interface for initiating inter-company transactions, allow requesters to limit participation in transactions to those companies that will provide necessary information, allow the companies to provide necessary information only once to the system and thereby access transactions which are limited to those that provide said necessary information, and protect the provided information provided from being sent to requesters who may choose to not enter into a transaction with said companies.

5. Implementation Example - Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
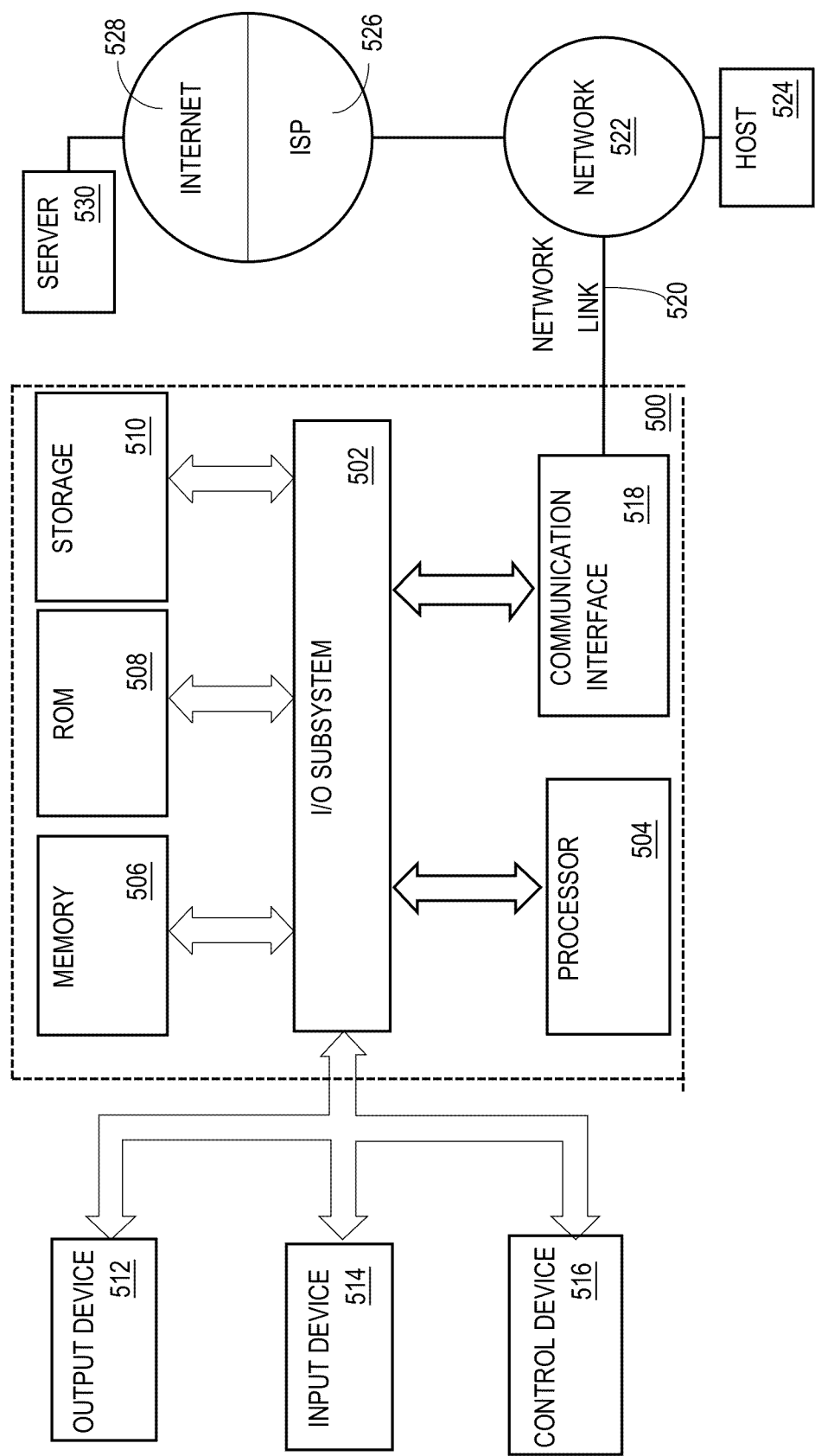
FIG. 5 is a block diagram that illustrates a computer system upon which an embodiment may be implemented.

For example, FIG. 5 is a block diagram that illustrates a computer system 500 upon which an embodiment may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:

using a management computer system, storing entity data defining a plurality of entities and associating each entity of the plurality of entities with a plurality of user accounts, the plurality of entities having access to the management computer system programmed to provide an interface for generating and performing a plurality of sourcing events with corresponding transactions between the plurality of the entities and for them to view and participate in with each other;

using the management computer system, storing data record requirement data identifying one or more required data record fields associated with a particular transaction for one or more entities prior to the one or more entities viewing or participating in the sourcing event of the particular transaction;

receiving, through the interface executing on a first client computing device corresponding to an account of a first entity, a request to initiate the sourcing event of the particular transaction;

receiving, through the interface executing on a second client computing device corresponding to an account of a second entity, a request to view or participate in the sourcing event of the particular transaction;

using the management computer system on the interface executing on the first client computing device, displaying a set of options for selecting a particular risk evaluation score which is required for the second entity to view and participate in the sourcing event of the particular transaction; in response to receiving a selection of the particular risk evaluation score by the first entity, storing data identifying each data record field and each template which are used to compute the particular risk evaluation score for the second entity;

determining, using the management computer system and based on entity data for the second entity, one or more templates containing one or more surveys required for the second entity to view and participate in the sourcing event of the particular transaction, wherein the one or more surveys contain the one or more required data record fields for computing the particular risk evaluation score for the second entity;

determining, from the entity data for the second entity, whether the management computer system has stored data for the one or more required data record fields of the one or more surveys for computing the particular risk evaluation score for the second entity;

in response to determining that the management computer system does not have the stored data for the one or more required data record fields of the one or more surveys for computing the particular risk evaluation score for the second entity:

generating one or more hyperlinks associated with the one or more surveys for the second entity which, when selected, would cause the second client computing device to display, through the interface executing on the second client computing device, one or more options for inputting data into the one or more required data record fields for computing the particular risk evaluation score;

through the interface executing on the second client computing device, restricting access to view or participate in the sourcing event of the particular transaction and causing to display the one or more hyperlinks, wherein the restricting access includes sending messages to accounts corresponding to the sourcing event of the particular transaction, restricting the second client computing device from bidding on the sourcing event of the particular transaction, or restricting the second client computing device from signing a contract associated with the sourcing event of the particular transaction;

through the interface executing on the second client computing device, displaying one or more summary features of the sourcing event of the particular transaction, obscuring one or more restricted features of the sourcing event of the particular transaction, and displaying the one or more hyperlinks corresponding to the one or more required data record fields of the one or more surveys for the second entity; and subsequently in response to determining that the second client computing device has input and the stored data in the one or more required data record fields of the one or more surveys to compute the particular risk evaluation score for the second entity, stopping the restricting access to view or participate in the sourcing event of the particular transaction.

2. The method of claim 1, further comprising:

causing displaying, on the first client computing device, one or more options for selecting data record fields from a plurality of data record fields;

receiving input, from the first client computing device, selecting a subset of the plurality of data record fields;

storing the subset of the plurality of data record fields as required data record fields for the first entity.

3. The method of claim 2, further comprising:

storing the one or more templates, each of the one or more templates comprising the plurality of data record fields;

wherein causing displaying the one or more options for selecting the data record fields comprises displaying, for each of the one or more templates, an option for selecting the template;

wherein the subset of the plurality of data record fields comprises each field in a particular template and wherein the input selecting the subset of the plurality of data record fields comprises input selecting the particular template.

4. The method of claim 2, further comprising:

receiving input, from the first client computing device, generating a new data record field;

storing the new data record field as a new required data record field for the first entity.

5. The method of claim 2, further comprising:

receiving, from the first client computing device, input selecting the particular transaction to correspond to the subset of the plurality of data record fields;

storing the subset of the plurality of data record fields as required data record fields for the first entity and the particular transaction.

6. The method of claim 2, further comprising:

receiving, from the first client computing device, input selecting a particular type of transaction to correspond to the subset of the plurality of data records;

storing the subset of the plurality of data record fields as required data record fields for the first entity and the particular type of transaction;

determining that the particular transaction is part of the particular type of transaction and, in response, determining whether the second entity has the stored data for the one or more required data record fields.

7. The method of claim 1, wherein the restricting access to view or participate in the sourcing event of the particular transaction comprises displaying the particular transaction, but not displaying an option to agree to participate in the particular transaction.

8. A computer-implemented method comprising:

using a management computer system, storing entity data defining a plurality of entities and associating each entity of the plurality of entities with a plurality of user accounts, the plurality of entities having access to the management computer system programmed to provide an interface for generating and performing a plurality of sourcing events with corresponding transactions between the plurality of the entities and for them to view and participate in;

storing data records requirement data identifying one or more required data record fields associated with one or more surveys for a particular transaction for one or more entities prior to the one or more entities viewing or participating in the sourcing event of the particular transaction;

receiving, through an interface executing on a first client computing device corresponding to an account of a first entity, a request to create a sourcing event of a particular transaction type;

generating the sourcing event of the particular transaction type;

receiving, through the interface executing on a second client computing device corresponding to an account of a second entity, a request to view or participate in the sourcing event;

using the management computer system on the interface executing on the first client computing device, displaying a set of options for selecting a particular risk evaluation score which is required for the second entity to view and participate in the sourcing event of the particular transaction; in response to receiving a selection of the particular risk evaluation score by the first entity, storing data identifying each data record field and each template which are used to compute the particular risk evaluation score for the second entity;

determining, using the management computer system and based on entity data for the second entity, one or more templates containing the one or more surveys for the second entity to view and participate in the sourcing event of the particular transaction, wherein the one or more surveys contain the one or more required data record fields for computing the particular risk evaluation score for the second entity;

determining, from the entity data for the second entity, whether the management computer system has stored data for the one or more required data record fields of the one or more surveys for computing the particular risk evaluation score for the second entity;

in response to determining that the management computer system does not have the stored data for the one or more surveys for computing the particular risk evaluation score for the second entity:
  generating one or more hyperlinks associated with the one or more surveys for the second entity which, when selected, would cause the second client computing device to display, through the interface executing on the second client computing device, one or more options for inputting data into the one or more surveys for computing the particular risk evaluation score;
  through the interface executing on the second client computing device, restricting access to view or participate in the sourcing event and causing to display the one or more hyperlinks, wherein the restricting access includes sending messages to accounts corresponding to the sourcing event, restricting the second client computing device from bidding on the sourcing event, or restricting the second client computing device from signing a contract associated with the sourcing event;
  through the interface executing on the second client computing device, displaying one or more summary features of the sourcing event, obscuring one or more restricted features of the sourcing event, and displaying the one or more hyperlinks corresponding to the one or more data record fields of the one or more surveys for the second entity; and
  subsequently in response to determining that the second client computing device has input and the stored data in the one or more required data record fields of the one or more surveys to compute the particular risk evaluation score for the second entity, stopping the restricting access to view or participate in the sourcing event of the particular transaction.

9. A system comprising:
  a memory storing entity data defining a plurality of entities and associating each entity of the plurality of entities with a plurality of user accounts, the plurality of entities having access to the system, wherein the system is programmed to provide an interface for generating and for performing a plurality of sourcing events with corresponding transactions between the plurality of the entities and for them to view and participate in, wherein the memory further stores data record requirement data identifying one or more required data record fields associated with a particular transaction;
  one or more processors which are configured to execute one or more instructions stored in the memory to cause performing:
    receiving, through the interface executing on a first client computing device corresponding to an account of a first entity, a request to initiate a particular transaction;
    receiving, through the interface executing on a second client computing device corresponding to an account of a second entity, a request to view or participate in the particular transaction;
    using the system on the interface executing on the first client computing device, displaying, a set of options for selecting a particular risk evaluation score which is required for the second entity to view and participate in the sourcing event of the particular transaction; in response to receiving a selection of the particular risk evaluation score by the first entity, storing data identifying each data record field and each template which are used to compute the particular risk evaluation score for the second entity;
    determining, using the system and based on entity data for the second entity, one or more templates containing one or more surveys for the second entity to view and participate in the sourcing event of the particular transaction, wherein the one or more surveys contain the one or more required data record fields for computing the particular risk evaluation score for the second entity;
    determining, from the entity data for the second entity, whether the system has stored data for the one or more required data record fields for computing the particular risk evaluation score for the second entity;
    in response to determining that the system does not have stored data for the one or more required data record fields for computing the particular risk evaluation score for the second entity:
      generating one or more hyperlinks associated with the one or more surveys for the second entity which, when selected, would cause the second client computing device to display, through the interface executing on the second client computing device, one or more options for inputting data into the one or more required data record fields for computing the particular risk evaluation score;
      through the interface executing on the second client computing device, restricting access to view or participate in the sourcing event of the particular transaction and causing to display the one or more hyperlinks, wherein the restricting access includes sending messages to accounts corresponding to the particular transaction, restricting the second client computing device from bidding on the particular transaction, or restricting the second client computing device from signing a contract associated with the particular transaction;
      through the interface executing on the second client computing device, displaying non-sensitive information corresponding to the sourcing event of the particular transaction, obscuring one or more restricted features of the sourcing event of the particular transaction, and displaying the one or more hyperlinks corresponding to the one or more data record fields of the one or more surveys for the second entity; and
      subsequently in response to determining that the second client computing device has input and the stored data in the one or more required data record fields to compute the particular risk evaluation score for the second entity, stopping the restricting access to view or participate in the particular transaction.

10. The system of claim 9, wherein the instructions, when executed by the one or more processors, further cause performance of:
  causing displaying, on the first client computing device, one or more options for selecting data record fields from a plurality of data record fields;
  receiving input, from the first client computing device, selecting a subset of the plurality of data record fields;
  storing the subset of the plurality of data record fields as required data record fields for the first entity.

11. The system of claim 10, wherein the instructions, when executed by the one or more processors, further cause performance of:
  storing the one or more templates, each of the one or more plurality of templates comprising the plurality of data record fields;
  wherein causing displaying the one or more options for selecting the data record fields comprises displaying, for each of the one or more templates, an option for selecting the template;

wherein the subset of the plurality of data record fields comprises each field in a particular template and wherein the input selecting the subset of the plurality of data record fields comprises input selecting the particular template.

12. The system of claim 10, wherein the instructions, when executed by the one or more processors, further cause performance of:

receiving input, from the first client computing device, generating a new data record field;

storing the new data record field as a new required data record field for the first entity.

13. The system of claim 10, wherein the instructions, when executed by the one or more processors, further cause performance of:

receiving, from the first client computing device, input selecting the particular transaction to correspond to the subset of the plurality of data record fields;

storing the subset of the plurality of data record fields as required data record fields for the first entity and the particular transaction.

14. The system of claim 10, wherein the instructions, when executed by the one or more processors, further cause performance of:

receiving, from the first client computing device, input selecting a particular type of transaction to correspond to the subset of the plurality of data records;

storing the subset of the plurality of data record fields as required data record fields for the first entity and the particular type of transaction;

determining that the particular transaction is part of the particular type of transaction and, in response, determining whether the second entity has the stored data for the one or more required data record fields.

15. The system of claim 9, wherein the restricting access to view or participate in the sourcing event of the particular transaction comprises displaying the particular transaction, but not displaying an option to agree to participate in the particular transaction.

16. The method of claim 3, further comprising:

determining a transaction type from a plurality of transaction types corresponding to the sourcing event of the particular transaction; and in response to determining the transaction type from the plurality of the transaction types, retrieving one or more templates from the plurality of templates containing the one or more surveys corresponding to the sourcing event of the particular transaction.

* * * * *